(12) United States Patent
Nishikawa

(10) Patent No.: US 9,619,221 B2
(45) Date of Patent: Apr. 11, 2017

(54) IMAGE FORMING APPARATUS, NETWORK SYSTEM, AND CONTROL METHOD OF IMAGE FORMING APPARATUS

(71) Applicant: CANON KABUSHIKI KAISHA, Tokyo (JP)

(72) Inventor: Satoshi Nishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 13/685,945

(22) Filed: Nov. 27, 2012

(65) Prior Publication Data

US 2013/0152065 A1 Jun. 13, 2013

(30) Foreign Application Priority Data

Dec. 13, 2011 (JP) ................... 2011-272749

(51) Int. Cl.
  *G06F 9/445* (2006.01)
  *G06F 9/44* (2006.01)
(52) U.S. Cl.
  CPC ............... *G06F 8/65* (2013.01); *G06F 8/665* (2013.01); *G06F 8/71* (2013.01)

(58) Field of Classification Search
  CPC ..................................... G06F 8/65; G06F 8/71
  See application file for complete search history.

(56) References Cited

U.S. PATENT DOCUMENTS

| 8,214,824 B2* | 7/2012 | Ookuma .................. 717/172 |
| 8,615,753 B2* | 12/2013 | Yuki ...................... 717/170 |
| 2011/0239208 A1* | 9/2011 | Jung .................... G06F 8/65 717/170 |

FOREIGN PATENT DOCUMENTS

JP 2011-060232 A 3/2011

* cited by examiner

*Primary Examiner* — Brian W Wathen
(74) *Attorney, Agent, or Firm* — Carter, DeLuca, Farrell & Schmidt, LLP

(57) ABSTRACT

For update of individual firmware of an image forming apparatus by a service person through a dedicated interface, an update information file indicating a range of versions of firmware in collective update is stored. In the collective update, applicable firmware is searched based on the versions included in the update information file to search sets of applicable firmware. When the sets of the applicable firmware searched in a distribution system are acquired, collective update of the firmware is performed based on a firmware set selected from the sets.

8 Claims, 14 Drawing Sheets

F I G. 2
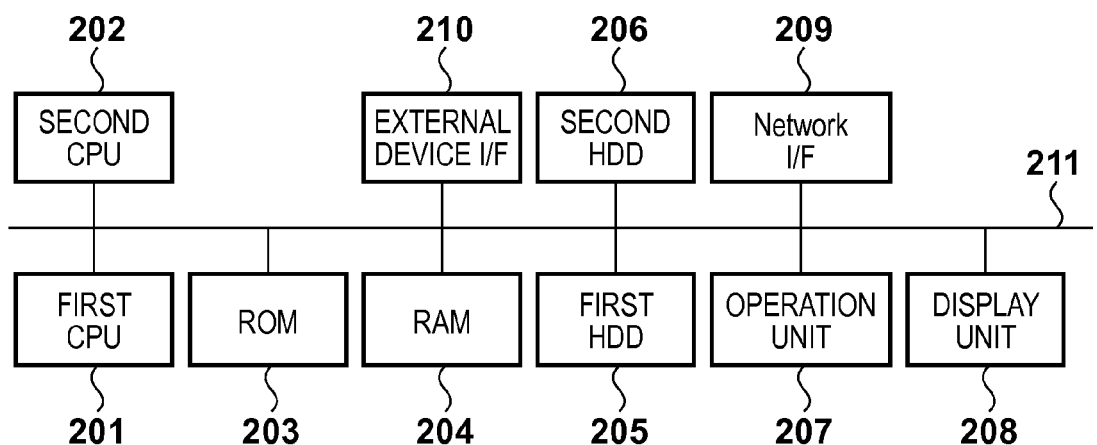
F I G. 3
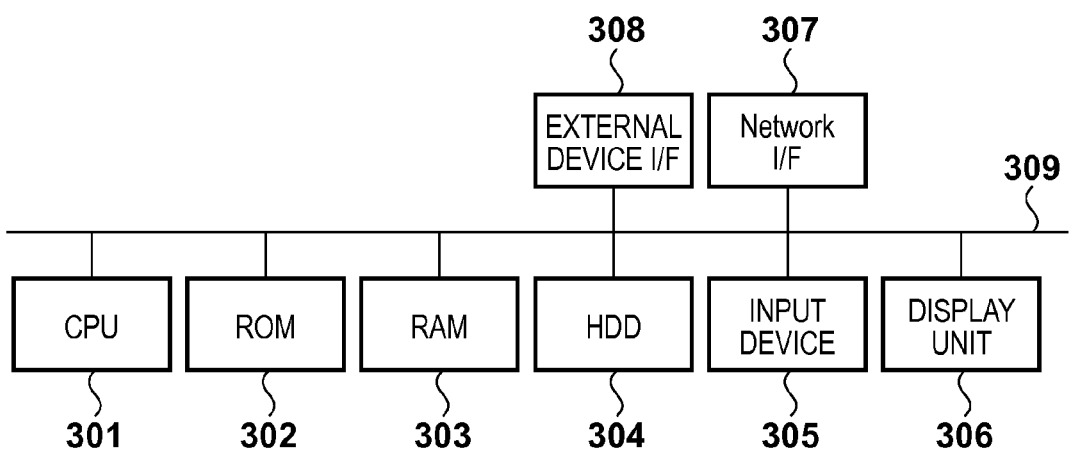

FIG. 11

- DEVICE ID
- CURRENT FIRMWARE COMPONENT INFORMATION LIST
  - FIRMWARE TYPE
  - FIRMWARE VERSION
- ACQUISITION INFORMATION
  - ACQUISITION TYPE (WHOLE/SPECIFIC/LATEST)
  - ADDITIONAL SET ACQUISITION MODE (ALL/ONLY ESSENTIAL)
  - SPECIFIC FIRMWARE ACQUISITION INFORMATION
    - ID
    - PASSWORD
  - OPERATOR CATEGORY (BY SERVICE PERSON/ BY USER/PERIODIC UPDATE)

- DEVICE OPERATING COUNTRY INFORMATION
    - LANGUAGE CODE
    - COUNTRY CODE
  - DEVICE INSTALLED REGION CODE

FIG. 12

- FIRMWARE INFORMATION LIST
  - BASIC SET INFORMATION
    - BASIC SET ID
    - FIRMWARE GROUP VERSION
    - FIRMWARE LABEL

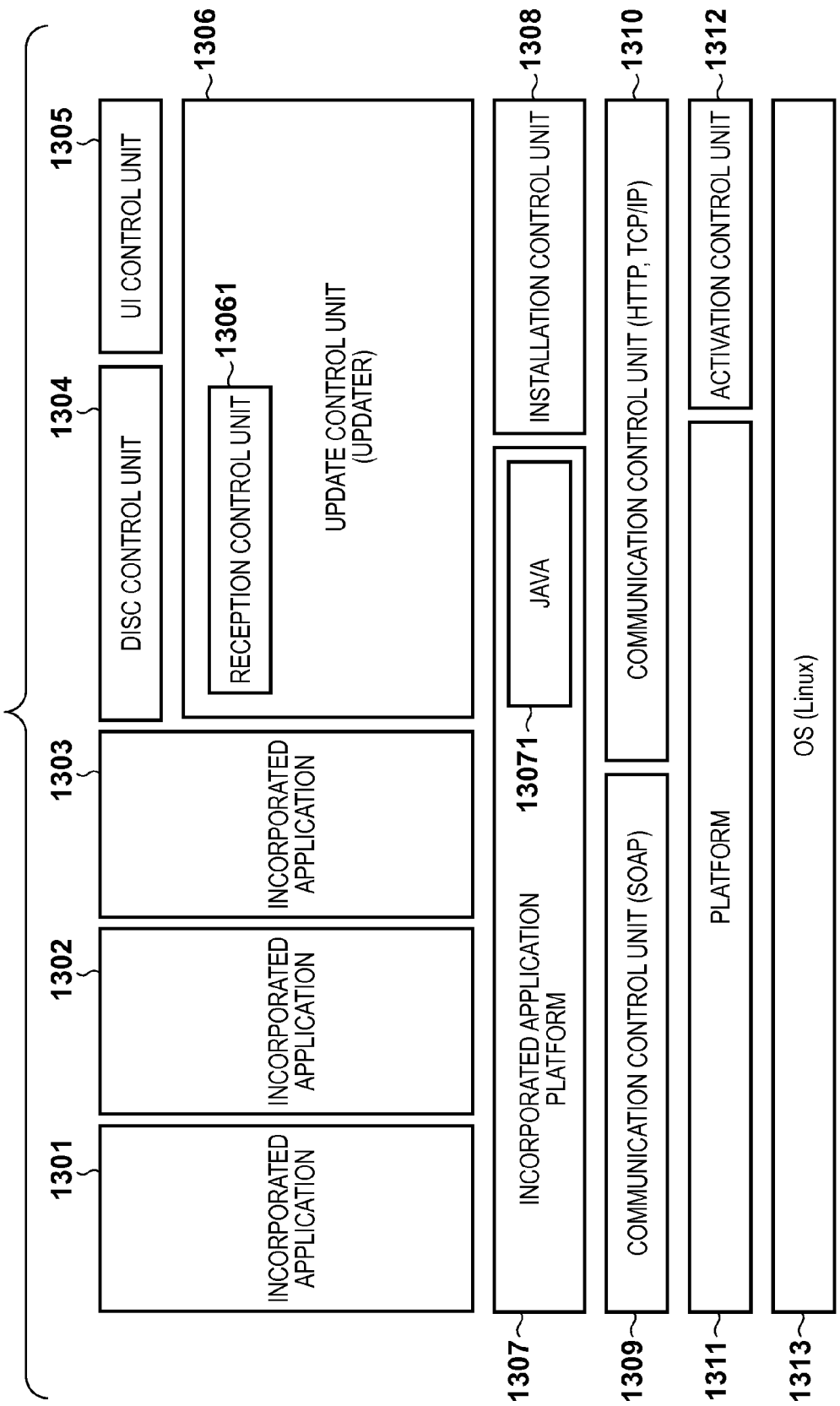

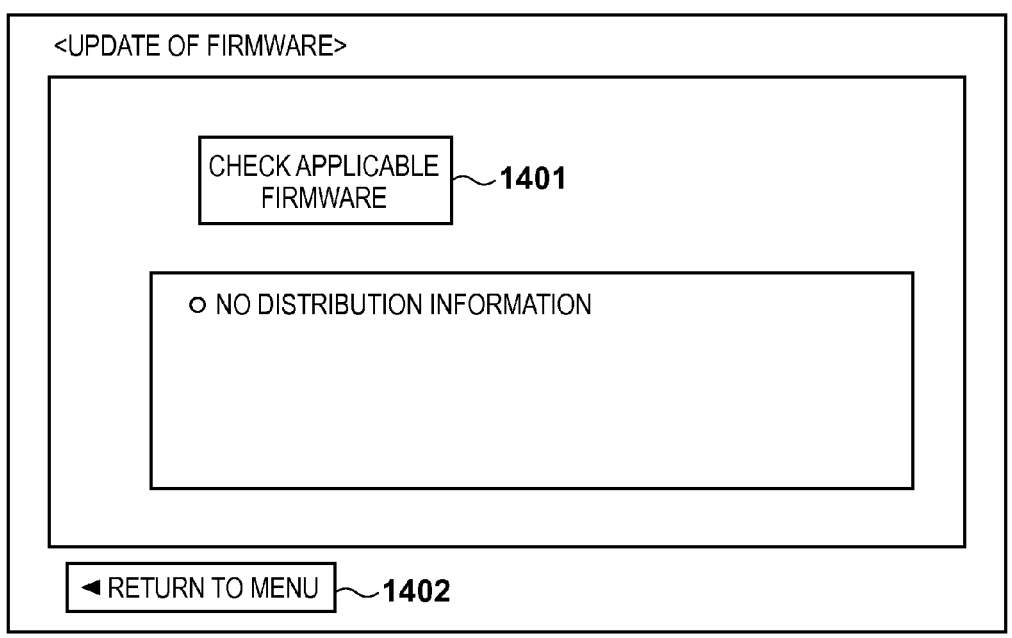
F I G. 14

FIG. 16A

| OptionFlag | 0 |
|---|---|
| FIRMWARE A | 1.0→1.1 |
| FIRMWARE B | 1.0→1.2 |

FIG. 16B

| OptionFlag | 1 |
|---|---|
| FIRMWARE A | 1.0→1.1 |

F I G. 17
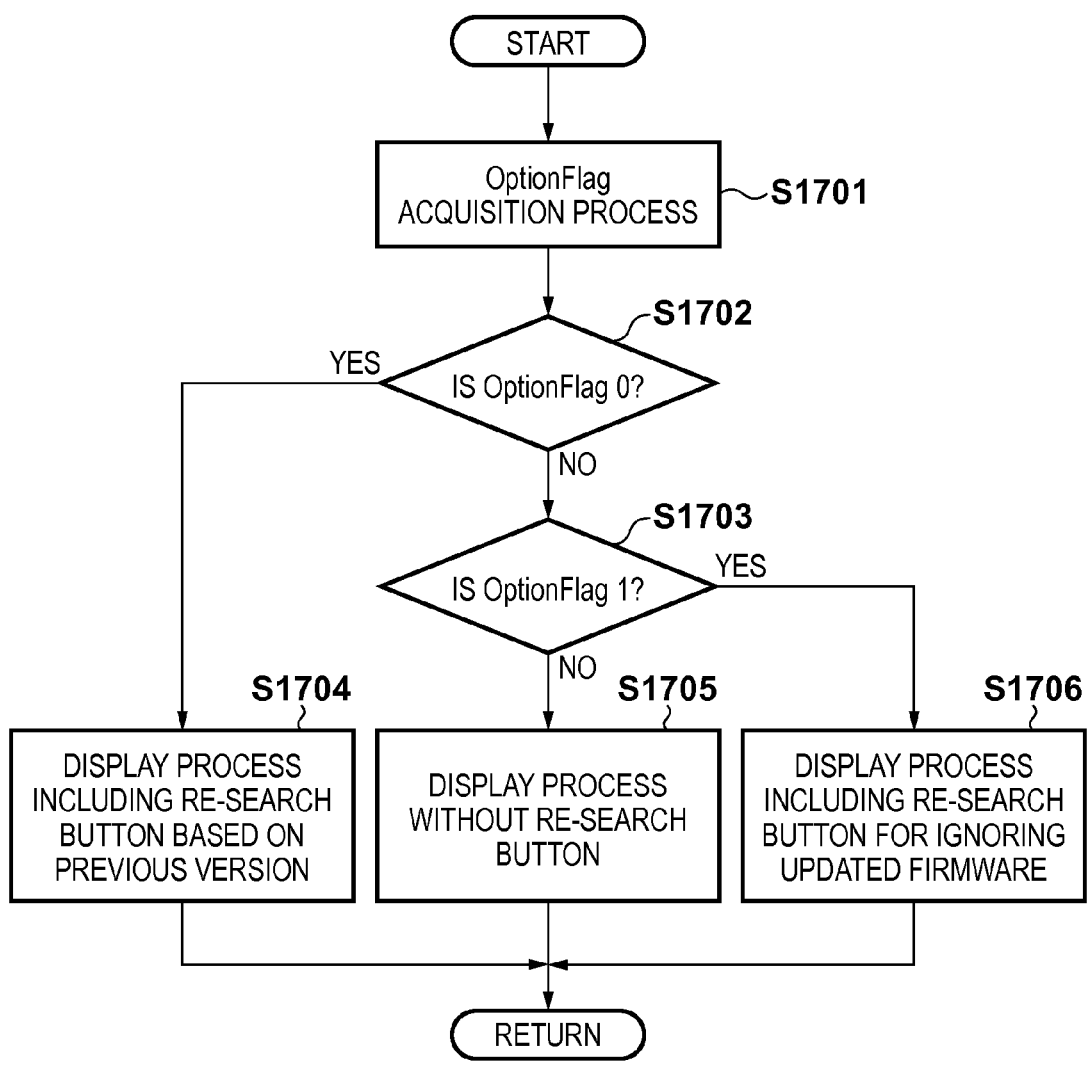

F I G. 18
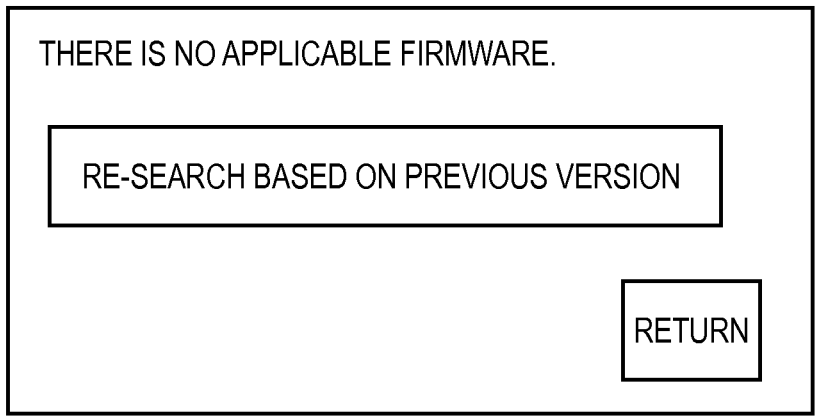
F I G. 19
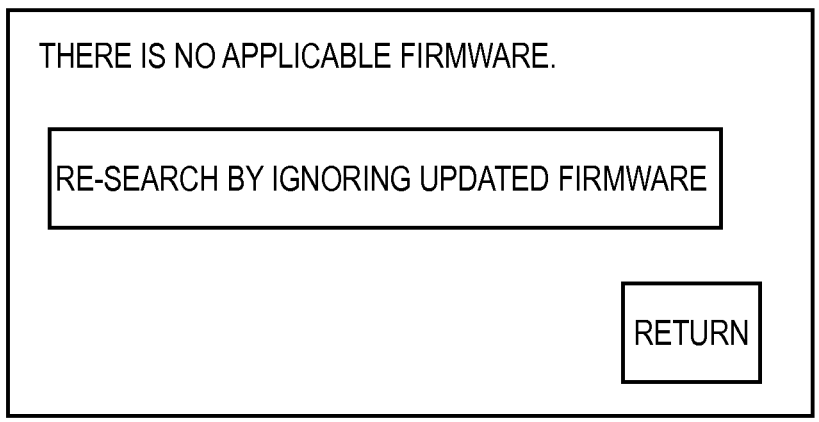

IMAGE FORMING APPARATUS, NETWORK SYSTEM, AND CONTROL METHOD OF IMAGE FORMING APPARATUS

BACKGROUND OF THE INVENTION

Field of the Invention

The present invention relates to an image forming apparatus, a network system, and a control method of the image forming apparatus.

Description of the Related Art

Conventionally, there is a monitoring system that remotely monitors an operation state of a peripheral device such as an image forming apparatus. The following techniques are proposed as methods of updating firmware of an image forming apparatus under an environment of the monitoring system.

For example, a technique is proposed in which firmware is stored in a rewritable storage device such as a flash memory, and firmware is received through the Internet to rewrite the flash memory based on the received firmware to update the firmware.

In this case, a system is proposed in which the update is reserved from the monitoring system for remote monitoring, or whether there is latest applicable firmware is checked through access to a server triggered by operation by an operator in an image forming apparatus or through automatic access to the server.

A technique is also proposed in which when a plurality of programs depend on each other in the update of the programs, order information indicating the order of update is acquired, and the plurality of programs are updated according to the order information (for example, see Japanese Patent Laid-Open No. 2011-60232).

However, there are the following problems in the system in which the image forming apparatus is triggered by the operation in the image forming apparatus to access the server to determine whether there is a firmware set including the latest firmware applicable to the image forming apparatus.

In such a system, a general operator is allowed to perform only collective update based on a specific set of firmware from the viewpoint of the security and the like. In that case, a set of installed firmware of previous versions is specified, and then a set of latest firmware for replacing the set is searched. To search the set of latest applicable firmware, a set of firmware of previous versions and a set of corresponding firmware of new versions are registered in a server, and information of current firmware of the image forming apparatus, such as an identifier and a version of the installed firmware, needs to be transmitted to the server.

When, for example, a service person updates part of the firmware through a dedicated service screen or the like, a combination of current versions of the firmware of the image forming apparatus may not be registered in the server. In this case, the set of latest applicable firmware cannot be searched even if the information of the firmware of the image forming apparatus is transmitted to the server, because the set of firmware of the versions is not registered in the server. Therefore, collective update of the set of firmware cannot be performed in this case.

SUMMARY OF THE INVENTION

The present invention provides a mechanism that allows collective update of a set of firmware even if the set of firmware installed in an image forming apparatus is not a combination of predetermined versions.

According to the present invention, an image forming apparatus comprises a storage unit that stores, upon individual update of firmware of an image forming apparatus, an update information file including information indicating a range of versions of individually updated firmware to be searched upon collective update of the firmware; a transmission unit that transmits, to a distribution system, a search request including the versions of the firmware in the range included in the update information file to search a set of firmware applicable to the image forming apparatus, in response to a collective update request of the firmware; and an update unit that acquires, from the distribution system, a set of applicable firmware searched by the distribution system and corresponding to the versions of the firmware included in the search request and that performs collective update of the set of the firmware.

The present invention can provide a mechanism that allows collective update of firmware even if a set of firmware installed in an image forming apparatus is not a combination of predetermined versions.

Further features of the present invention will become apparent from the following description of exemplary embodiments with reference to the attached drawings.

BRIEF DESCRIPTION OF THE DRAWINGS

FIG. 2 is a diagram showing an example of a hardware configuration of a monitoring center host;

FIG. 3 is a diagram showing an example of a hardware configuration of a monitoring apparatus;

FIG. 11 is a diagram showing an example of a SOAP message transmitted from the image forming apparatus;

FIG. 12 is a diagram showing an example of a SOAP message returned from the distribution server;

FIG. 13 is a diagram showing an example of a firmware configuration of the image forming apparatus;

FIG. 14 is a diagram showing an example of a user interface screen;

FIGS. 16A and 16B are diagrams showing configuration examples of an update information file used in the re-search process;

FIG. 17 is a flow chart showing details of a display process of S1505;

FIG. 18 is a diagram showing a screen for instructing a re-search process based on a previous version;

FIG. 19 is a diagram showing a screen for instructing a re-search process by ignoring updated firmware.

DESCRIPTION OF THE EMBODIMENTS

Embodiments for carrying out the invention will now be described in detail with reference to the drawings.

<System Configuration>

Figure 1:
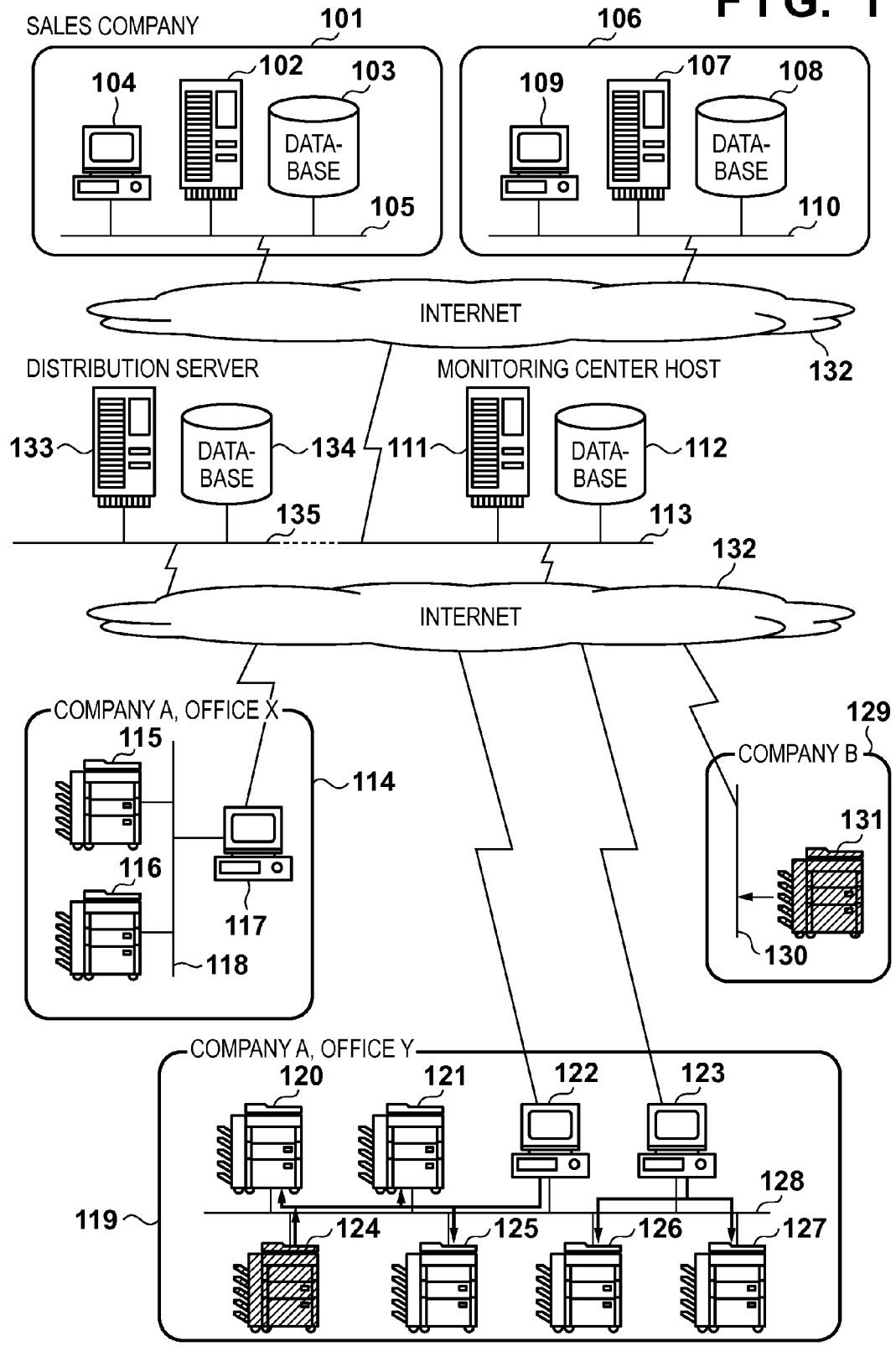
FIG. 1 is a diagram showing an overall configuration example of a monitoring system according to an embodiment.

An overall configuration example of a monitoring system according to an embodiment will be described with reference to FIG. 1. As shown in FIG. 1, systems 101 and 106 of a plurality of sales companies are connected to the monitoring system. Databases 103 and 108 for storing sales information of managed regions or customers and information related to the monitoring system are also included in the systems 101 and 106.

The systems 101 and 106 also include personal computers (PCs) 104 and 109 that control registration or correction of data in the databases 103 and 108. Web browsers are installed in the PCs 104 and 109, and a Web site provided by a monitoring center host 111 as a server on the Internet is accessed through the Web browsers to view the data.

The systems 101 and 106 include sales company hosts 102 and 107 that use data of the monitoring center host 111 to assume roles of performing operations of sales companies, such as a charge process and a service person dispatch process. The systems 101 and 106 also include operation units as well as display units and can also play roles of the PCs 104 and 109.

The sales company host 102, the database 103, and the PC 104 are connected by a LAN 105, and similarly, the sales company host 107, the database 108, and the PC 109 are connected by a LAN 110. Although the systems 101 and 106 of the sales companies include a plurality of apparatuses in FIG. 1, the systems 101 and 106 may include only one apparatus if functions described below can be attained. For example, the databases 103 and 108 may physically exist in the sales company hosts 102 and 107, respectively, or may exist at other locations through the Internet as long as the sales company hosts 102 and 107 can access the databases 103 and 108.

The monitoring center host 111 exists between a sales company system and a customer system. The monitoring center host 111 includes a database 112 that functions as a history storage device that stores information for monitoring, a counter of an image forming apparatus collected from the customer system, malfunction history information, a malfunction pattern table, and the like. The monitoring center host 111 and the database 112 are connected by a LAN 113, and connection to the Internet is possible through the LAN 113. The database 112 may physically exist in the monitoring center host 111. The database 112 may also exist at another location through the Internet as long as the monitoring center host 111 can access the database 112.

The monitoring center host 111 has functions of collecting, storing, and processing information of an image forming apparatus to be monitored, information indicating an operation state, malfunction information, and the like from monitoring apparatuses 117, 122, 123, and 131 described later and of providing a warning and the like to the outside. For example, the monitoring center host 111 plays a role (has a function) of distributing the information to the sales company hosts 102 and 107. Examples of the information include out of toner, door open, drum replacement, no cartridge, cooling fan malfunction, substrate malfunction, glass copy board stain, out of staple, and lack of paper feeding sensor light amount. Other examples of the information include font memory overflow, rendering error, fuser malfunction, counter malfunction, double-side unit malfunction, and paper jam. Examples of counter information include charge counter for charging sales company, category counter complied by category of customer, size counter compiled by paper size, and component counter indicating the degree of consumption of components in the image forming apparatus.

The charge counter indicates the number of prints of the image forming apparatus, and the category counter indicates the number of prints of each category set by the customer. The component counter counts the number of rotations for a component, such as a drum, and counts the time (seconds) for a component, such as a scanner lamp. Information indicating operation information of the components serves as operation information.

The sales company hosts 102 and 107 can also register the information of the image forming apparatus as a monitoring target and the setting related to monitoring in the monitoring center host 111. The monitoring center host 111 can merge and collectively manage the settings related to the image forming apparatus as a monitoring target and related to the monitoring registered from the sales company hosts 102 and 107. The monitoring center host 111 can also configure settings related to the monitoring for the monitoring apparatuses 117, 122, 123, and the image forming apparatus 131.

A service by the monitoring system is provided based on a contract between the sales company and the customer. Therefore, only the image forming apparatus determined to be a monitoring target by the sales company based on the contract is the monitoring target of the monitoring system. The monitoring center host 111 provides a Web page for viewing the information stored in the database 112 or processed information to the PC connected through the Internet. In the Web page, the content that can be viewed is limited and provided based on the sales company, the customer, and the right of the user, through user authentication. Part of the data can also be changed from the Web page.

A distribution server 133 exists between the sales company system and the customer system. A database 134 stores firmware and applications applied to the image forming apparatus, software license information, and the like, and the database 134 functions as a storage device. The distribution server 133 and the database 134 are connected by a LAN 135, and connection to the Internet is possible through the LAN 135. The database 134 may physically exist in the distribution server 133. The database 134 may exist at another location through the Internet as long as the distribution server 133 can access the database 134. The LAN 113 and the LAN 135 may be the same, and the database 134 and the database 112 may share the data.

The number of each of the monitoring center host 111, the database 112, the distribution server 133, and the database 134 is one in the example shown in FIG. 1. However, a plurality of monitoring center hosts and databases may actually execute a dispersion process to disperse the load of collecting of information from a large number of image forming apparatuses and monitoring apparatuses and the load of distributing firmware. A plurality of distribution servers and databases may be used to execute a distribution process. In the following description, the distribution server 133 and the database 134 that can communicate with the distribution server 133 will be collectively called a "distribution system" to simplify the description. It is obvious that the distribution system may be realized by the same information processing apparatus, such as a personal computer (PC).

A system configuration of the customer side will be described. A plurality of different environments exist in the customer system. FIG. 1 shows customer systems 114, 119, and 129. In the customer system 114 (company A, office X), a monitoring apparatus 117 monitors image forming apparatuses 115 and 116 through a LAN 118 that can be connected to the Internet, and the monitoring apparatus 117 can communicate with the monitoring center host 111 through the Internet.

Meanwhile, in the customer system 119 (company A, office Y), monitoring apparatuses 122 and 123 manage image forming apparatuses 120, 121, and 124 to 127 on a LAN 128. In the example, the monitoring apparatus 122 manages the image forming apparatuses 120, 121, 124, and 125, and the monitoring apparatus 123 manages the image forming apparatuses 126 and 127.

In the customer system 129 (company B), the image forming apparatus 131 can directly communicate with the monitoring center host 111 via the Internet through the LAN 130 that can connect to the Internet. The image forming apparatus 131 has the same functions as the monitoring apparatuses 117, 122, and 123 and actively transmits information of the image forming apparatus 131 (for example, counter information and generation of a malfunction) to the monitoring center host 111.

The following should be noted.

(1) In the communication through the Internet with the configuration described above, HTTP/SOAP (Simple Object Access Protocol) can be used. The SOAP is a protocol for calling out data or a service from a computer to another computer based on XML (eXtended Markup Language). In the example, the SOAP is mounted on HTTP. The communication based on the SOAP is performed by exchanging a SOAP message obtained by attaching supplementary information to an XML document.

Therefore, the computer that supports the SOAP includes a SOAP message generation unit that generates a SOAP message and a SOAP message interpretation unit that interprets the SOAP message. The state information of the image forming apparatus is transmitted to the monitoring center host 111 through the SOAP message in the present embodiment.

(2) The image forming apparatuses in the customer system of the company A communicate with the monitoring center host 111 through the monitoring apparatus in the above description. However, the setting may be changed so that the image forming apparatuses communicate with the monitoring center host without the involvement of the monitoring apparatus, as in the image forming apparatus 131 installed in the customer system of the company B.

<Hardware Configuration>

An example of a hardware configuration of the monitoring center host 111 will be described with reference to FIG. 2. Hardware configurations of the distribution server 133 and the sales company hosts 102 and 107 are similar to the configuration of the monitoring center host 111.

In FIG. 2, a first CPU 201 and a second CPU 202 manage processes of the monitoring center host 111. A non-rewritable ROM 203 stores programs and data related to the processes. A RAM 204 can electrically store temporary data related to the processes and is rewritable.

A first HDD 205 and a second HDD 206 store programs and data related to the processes, temporary data, information related to the image forming apparatus to be monitored, information collected from the image forming apparatus, and the like. For example, a component counter, a charge counter, and a category counter are stored in the hard disks.

Figure 6:
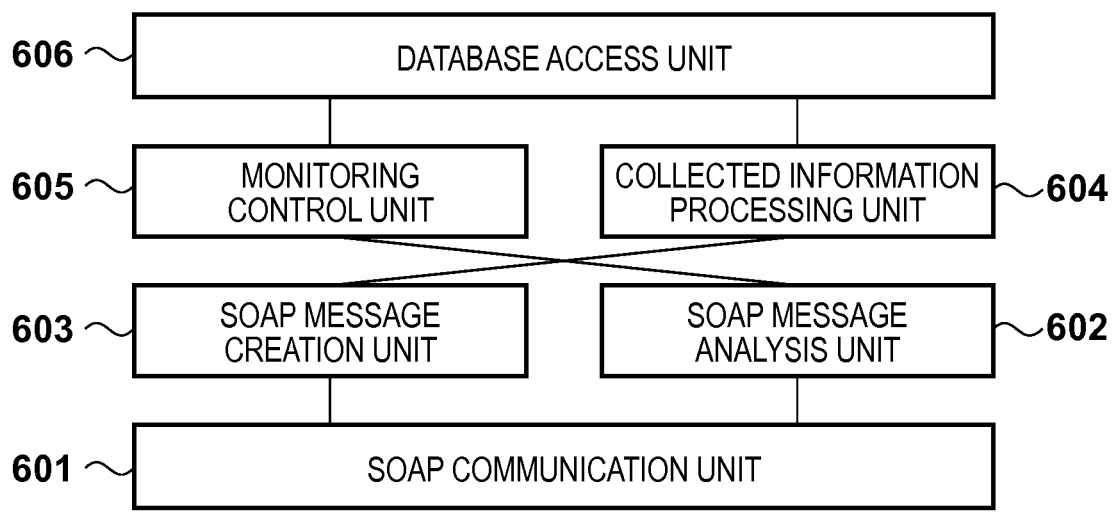
FIG. 6 is a diagram showing an example of a software configuration of a part related to a monitoring system in a monitoring center host and a distribution server.

In the case of the monitoring center host 111, a process shown in FIG. 6 described later is included in the first HDD 205. This program uses the RAM 204 as a temporary storage area, and the first CPU 201 or the second CPU 202 calls out and executes the program. In the case of the distribution server 133, the process shown in FIG. 6 described later is also included in the first HDD 205. This program uses the RAM 204 as a temporary storage area, and the first CPU 201 or the second CPU 202 calls out and executes the program.

An operation unit 207 functions as an input device including a keyboard and a pointing device for receiving input of an instruction for the monitoring center host 111. A display unit 208 displays an operation status of the monitoring center host 111 and information output by each operating program. A network I/F 209 is connected to a LAN or the Internet through a network to exchange information with the outside. An external device I/F 210 is connected to an external storage device and the like. The elements are connected by a system bus 211 to transfer data.

An example of a hardware configuration of the monitoring apparatuses 117, 122, and 123 will be described with reference to FIG. 3. A hardware configuration of the PCs 104 and 109 is similar to the hardware configuration shown in FIG. 3.

A CPU 301 manages the processes on the monitoring apparatus. A ROM 302 stores programs and data related to the processes and is non-rewritable. A RAM 303 can electrically store temporary data related to the processes and is rewritable. In the monitoring apparatus 117, programs and data related to the processes, temporary data, information related to the image forming apparatus to be monitored, information collected from the image forming apparatus, and the like are stored in an HDD 304. In the PCs 104 and 109, Web pages and the like are stored in the HDD 304.

An input device 305 is a keyboard or a pointing device for receiving input of an instruction for the monitoring apparatus. A display unit 306 displays an operation status of the monitoring apparatus and information output by the programs operating on the apparatus. A Network I/F 307 is connected to a LAN or the Internet through a network to exchange information with the outside. An external device I/F 308 connects to an external storage device and the like. These are connected by a system bus 309 to transfer data.

Figure 4:
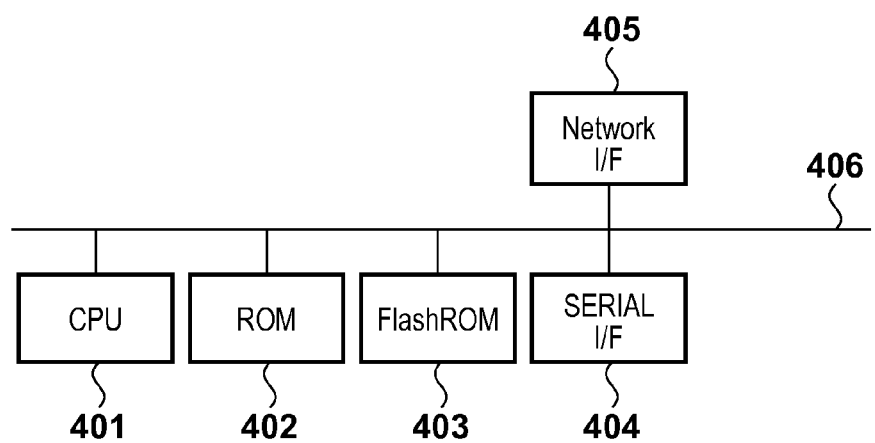
FIG. 4 is a diagram showing another hardware configuration of the monitoring apparatus.

Another hardware configuration of the monitoring apparatuses 117, 122, and 123 will be described with reference to FIG. 4. A CPU 401 manages the processes on the monitoring apparatus. A ROM 402 stores programs and data related to the processes and is non-rewritable. A Flash ROM 403 stores data related to the programs, temporary data, information related to the image forming apparatus to be monitored, information collected from the image forming apparatus, and the like. A program on the monitoring apparatus outputs an error or a log, and a serial I/F 404 allows connection to a terminal using a serial cable. A Network I/F 405 is connected to a LAN or the Internet through a network to exchange information with the outside. These are connected by a system bus 406 to transfer data.

Figure 5:
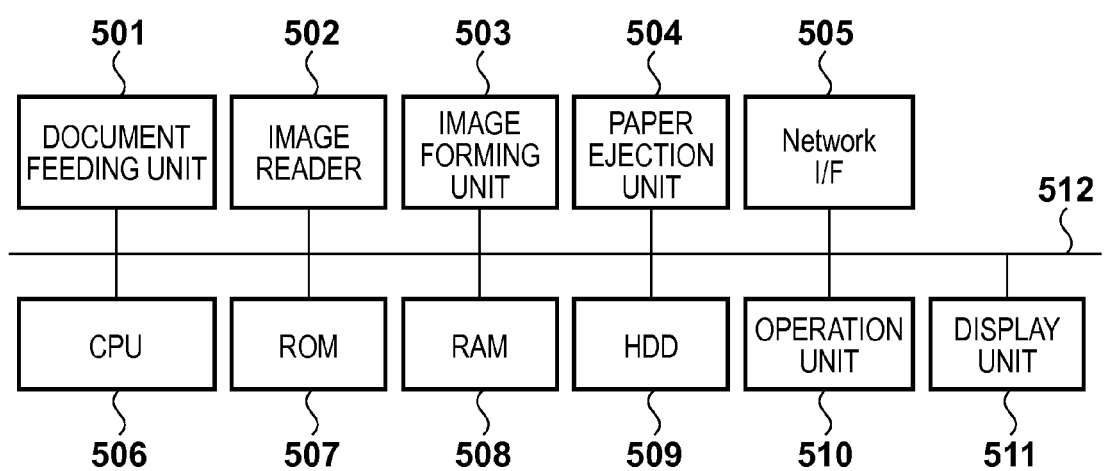
FIG. 5 is a diagram showing an example of a hardware configuration in an image forming apparatus.

An example of a hardware configuration in the image forming apparatuses 115, 116, 120, 121, 124 to 127, and 131 will be described with reference to FIG. 5. Specifically, examples of the image forming apparatus include a multifunction machine integrally provided with printer and facsimile functions, a printer that receives and prints data from a PC or the like (including an electrophotographic system and an inkjet system), a scanner, and a facsimile. FIG. 5 illustrates a configuration of a multifunction machine as an example of the image forming apparatus.

In an image reader 502, a document feeding unit 501 reads a document. The image reader 502 and an image forming unit 503 convert the read document or data received through a network to a print image and print and output the print image. A paper ejection unit 504 ejects the printed and output paper and applies a process of sorting or stapling. A Network I/F 505 connects to a LAN or the Internet through the network to exchange information with the outside.

A CPU 506 manages the processes on the image forming apparatus. The CPU 506 monitors an operation state of the image forming apparatus, and if a specific event such as a malfunction occurs, the CPU 506 transmits state information indicating the state to a predetermined destination. Examples of the destination include the monitoring center host 111 and the monitoring apparatus. A ROM 507 as a non-volatile storage device stores programs and data related to the processes. A rewritable RAM 508 electrically stores temporary data related to the processes. An HDD 509 stores programs and data related to the processes, temporary data, user data transmitted to the image forming apparatus, and the like.

Figure 8:
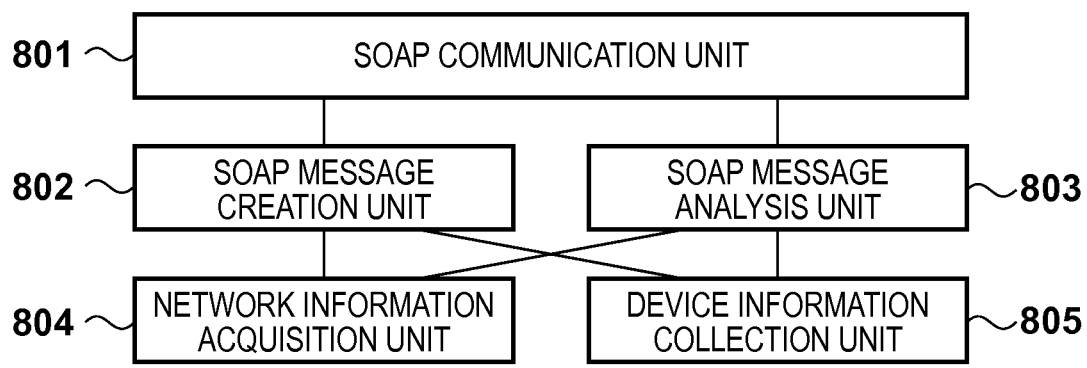
FIG. 8 is a diagram showing an example of a software configuration of a part related to a monitoring system in the image forming apparatus.

In the image forming apparatus, the HDD 509 includes a process of FIG. 8 described later. This program uses the RAM 508 as a temporary storage area, and the CPU 506 calls out and executes the program.

An operation unit 510 receives input of an instruction for the image forming apparatus. A display unit 511 displays an operation status of the image forming apparatus and information related to the operation for the operation unit 510. These are connected by a system bus 512 to transfer data.

In the image forming apparatus 131 that has a function of actively transmitting the information for monitoring by the image forming apparatus, the ROM 507 or the HDD 509 holds programs and data regarding the monitored data transmission process.

<Software>

An example of a software configuration of a part related to the monitoring system in the monitoring center host 111 and the distribution server 133 will be described with reference to FIG. 6. A SOAP communication unit 601 transfers, to a SOAP message analysis unit 602, SOAP data received from monitoring apparatus 117, 122, 123, or the image forming apparatus 131 through the Network I/F 209. The SOAP communication unit 601 also transmits SOAP data created by a SOAP message creation unit 603 to the monitoring apparatus 117, 122, 123, or the image forming apparatus 131 through the Network I/F 209.

A collected information processing unit 604 stores, with or without processing, information received from the monitored monitoring apparatus 117, 122, 123, or the image forming apparatus 131 in the database 112 or 134 through a database access unit 606.

The collected information processing unit 604 also realizes a function related to a remote monitoring system. The collected information processing unit 604 notifies a service person in charge or a customer manager of information received from the monitored monitoring apparatus 117, 122, 123, or the image forming apparatus 131, compilation of counter information based on data stored in the databases 112 and 134, error information, and firmware latest information.

A monitoring control unit 605 manages a schedule for acquiring the information of the monitoring apparatuses 117, 122, 123, and the image forming apparatus 131 and controls details and a method of monitoring. If necessary, the monitoring control unit 605 further transmits instructions to the monitored monitoring apparatuses 117, 122, 123, and the image forming apparatus 131 through the SOAP message creation unit 603, the SOAP communication unit 601, and the Network I/F 209.

Figure 7:
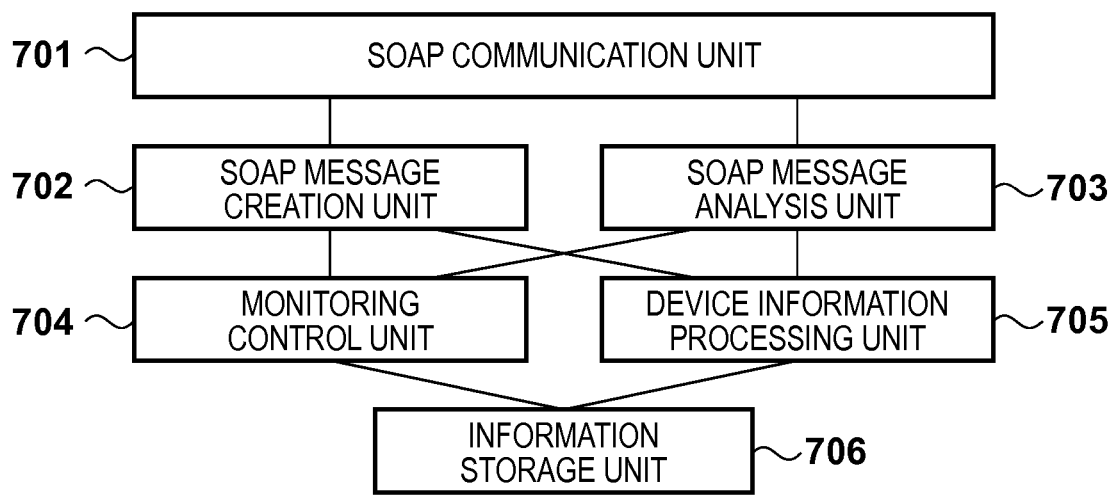
FIG. 7 is a diagram showing an example of a software configuration of a part related to a monitoring system in the monitoring apparatus.

An example of a software configuration of a part related to the monitoring system in the monitoring apparatuses 117, 122, and 123 will be described with reference to FIG. 7. A SOAP communication unit 701 transfers SOAP data received from the monitoring center host 111 through the Network I/Fs 307 and 405 to a SOAP message analysis unit 703. The SOAP communication unit 701 also transmits SOAP data created by a SOAP message creation unit 702 to the monitoring center host 111 and the distribution server 133 through the Network I/Fs 307 and 405.

According to the setting of monitoring from the monitoring center host 111 described later, a monitoring control unit 704 updates monitored image forming apparatus information held in an information storage unit 706 and acquires information of the image forming apparatuses 115 and 116 to manage the schedule.

According to the schedule managed by the monitoring control unit 704, a device information processing unit 705 stores counter information actively collected by the monitoring apparatus from the image forming apparatuses 115 and 116 and information of service call, jam, out of toner, and the like in an information storage unit 706. This storage is performed according to the states of the image forming apparatuses 115 and 116.

The data stored in the information storage unit 706 is transferred to the SOAP message creation unit 702 through the device information processing unit 705 and transmitted to the monitoring center host 111. Alternatively, in some cases, the device information processing unit 705 interprets and processes the data, and the data is transferred to the SOAP message creation unit 702 and transmitted to the monitoring center host 111.

An example of a software configuration of a section related to the monitoring systems in the image forming apparatuses 115, 116, 120, 121, 124 to 127, and 131 will be described with reference to FIG. 8. A SOAP communication unit 801 transfers SOAP data received from the monitoring center host 111 and the distribution server 133 through the Network I/F 505 to a SOAP message analysis unit 803. The SOAP communication unit 801 transmits SOAP data created by a SOAP message creation unit 802 to the monitoring center host 111 and the distribution server 133 through the Network I/F 505.

A network information acquisition unit 804 can automatically acquire an IP address, a DNS server, and a gateway address in a DHCP environment. If there is network information input from the operation unit 510 and stored in the HDD 509, a network information acquisition unit 804 acquires the information.

A device information collection unit 805 acquires internally held counter information based on a schedule inside of the multifunction machine or based on an instruction from the monitoring center host 111 and acquires information of internally generated service call, jam, out of toner, and the like. The acquired data is transferred to the SOAP message creation unit 802 and transmitted to the monitoring center host 111. Alternatively, the device information collection unit 805 stores, interprets, and processes the acquired data, and the data is transferred to the SOAP message creation unit 802 and transmitted to the monitoring center host 111.

Figure 9:
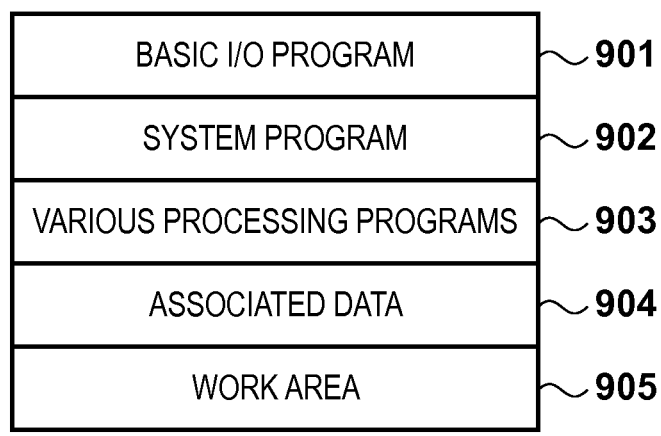
FIG. 9 is a diagram showing a structure of a memory map of the monitoring center host, the distribution server, the monitoring apparatus, or the image forming apparatus.

A structure of a memory map in the monitoring center host 111, the distribution server 113, the monitoring apparatuses 117, 122, 123, or the image forming apparatuses 115, 116, 120, 121, 124 to 127, and 131 will be described with reference to FIG. 9. FIG. 9 is a memory map obtained by loading a processing program on the RAM 204 in the monitoring center host 111, on the RAM 303 or the Flash ROM 403 in each monitoring apparatus 117, and on the RAM 508 in each image forming apparatus, at the execution of the program.

The memory map includes a basic I/O program 901, a system program 902, various processing programs 903 including a processing program of the present embodiment, associated data 904, and a work area 905 of the programs. The basic I/O program 901 manages input and output on the apparatus. The system program 902 provides an operation environment to each processing program.

If areas used for programs, data, and work areas are insufficient due to restrictions in the capacity, the first HDD 205 or the second HDD 206 may be handled as part of the area of the RAM 204, the HDD 304 may be handled as part of the area of the RAM 303, and the HDD 509 may be handled as part of the area of the RAM 508.

According to the configuration, information is communicated between the distribution server 133, the monitoring center host 111, and the image forming apparatus, and content (programs of firmware, application software, or batches) is distributed.

<Network System>

Figure 10:
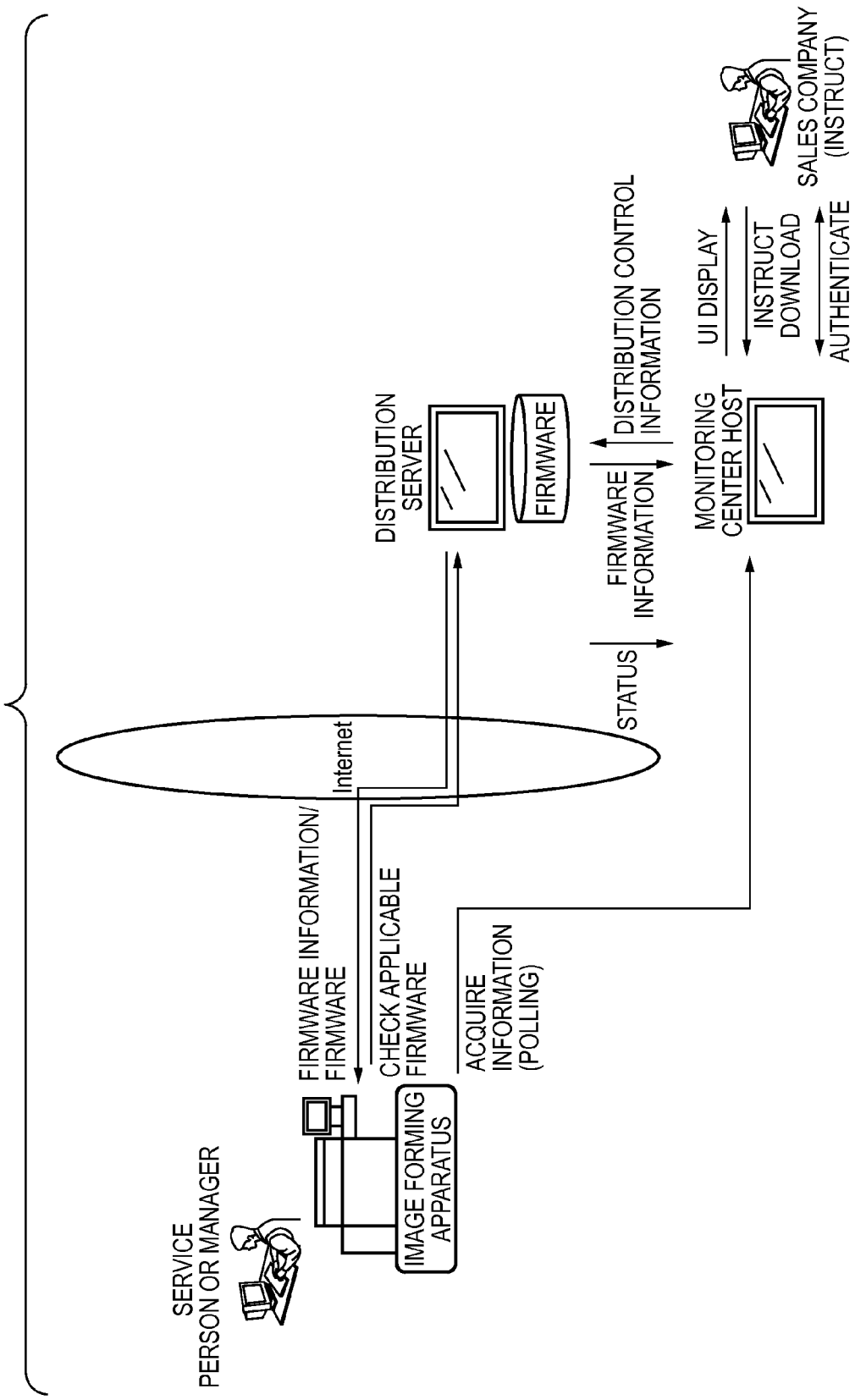
FIG. 10 is a diagram showing a configuration of a network system specific to distribution of content.

A configuration of a network system specific to the distribution of content will be described with reference to FIG. 10. As shown in FIG. 10, a distribution system including an image forming apparatus, a distribution server, and a database and a monitoring center host are connected to each other and can mutually communicate through the Internet in the network system. The monitoring system of FIG. 1 is simplified to describe FIG. 10 from the viewpoint of the distribution of content, such as distribution of firmware. The image forming apparatus of FIG. 10 may be connected to the Internet 132 through the monitoring apparatuses 117, 122, and 123, as with the image forming apparatuses 115, 116, and 120 to 127 of FIG. 1. The distribution server and the monitoring center host are equivalent to the distribution server 133 and the monitoring center host 111 of FIG. 1, respectively, and may be connected through a LAN. A service person or a manger is equivalent to the monitoring apparatus, and the sales company is equivalent to a terminal of a sales company system, particularly a web browser.

The firmware is distributed based on an instruction from the monitoring center host in some cases, and the service person or the manager actually operates the image forming apparatus to provide an instruction in other cases. Immediately or at a reserved time, the image forming apparatus transmits a message for checking applicable firmware to the distribution system. This process is a process of transmitting information indicating a current set of firmware of the image forming apparatus to the distribution system and checking whether there is firmware that can be distributed in the firmware registered in the distribution system. Specifically, a SOAP message as shown in FIG. 11 is transmitted to the distribution system. If there is applicable firmware, a SOAP message including a firmware information list as shown in FIG. 12 is returned from the distribution system to the image forming apparatus, and applicable firmware sets are indicated. One of the indicated firmware sets is selected, and the selected firmware set is downloaded and updated collectively. The applicable firmware denotes a new firmware set corresponding to an installed firmware set and denotes a firmware set registered in the distribution server 133 (or the database 134). In this way, the applicable firmware set may also be called applicable firmware.

In the distribution system, the firmware of the image forming apparatus is registered as a firmware group (or a firmware set) combining a plurality of pieces of firmware, and the version of the group is used for the classification and the management. The version of the group will be called a firmware group version. Therefore, although the firmware information list includes a firmware group version of applicable firmware as shown in FIG. 12, the firmware group version will be simply called a version of applicable firmware in some cases.

An example of firmware in the image forming apparatus will be described with reference to a software configuration diagram shown in FIG. 13. The software shown in FIG. 13 is read from the HDD 509 to the RAM 508 of FIG. 5 under the control of the OS, and the CPU 506 executes the software.

In the example, an incorporated application platform 1307 and a plurality of incorporated applications 1301, 1302, and 1303 operating on the platform are the firmware set. When the manager performs an update operation on a user interface screen displayed by a UI control unit 1305, an update control unit 1306 acquires applicable firmware from the distribution system through a reception control unit 13061, and an installation control unit 1308 updates the firmware. In the example, the incorporated application platform includes a JAVA execution module 13071, and the incorporated applications 1301, 1302, and 1303 are described in JAVA®. Obviously, the platform is not limited to JAVA, and for example, another language processing system may also be used as the platform. The image forming apparatus further includes a communication control unit 1309 of SOAP and a communication control unit 1310 of TCP/IP and HTTP as a communication protocol stack. A communication platform 1311 and an OS 1313 control the communication control units 1309 and 1310. An activation control unit 1312 that controls activation of the apparatus is also included.

<Re-search Process>

Figure 15:
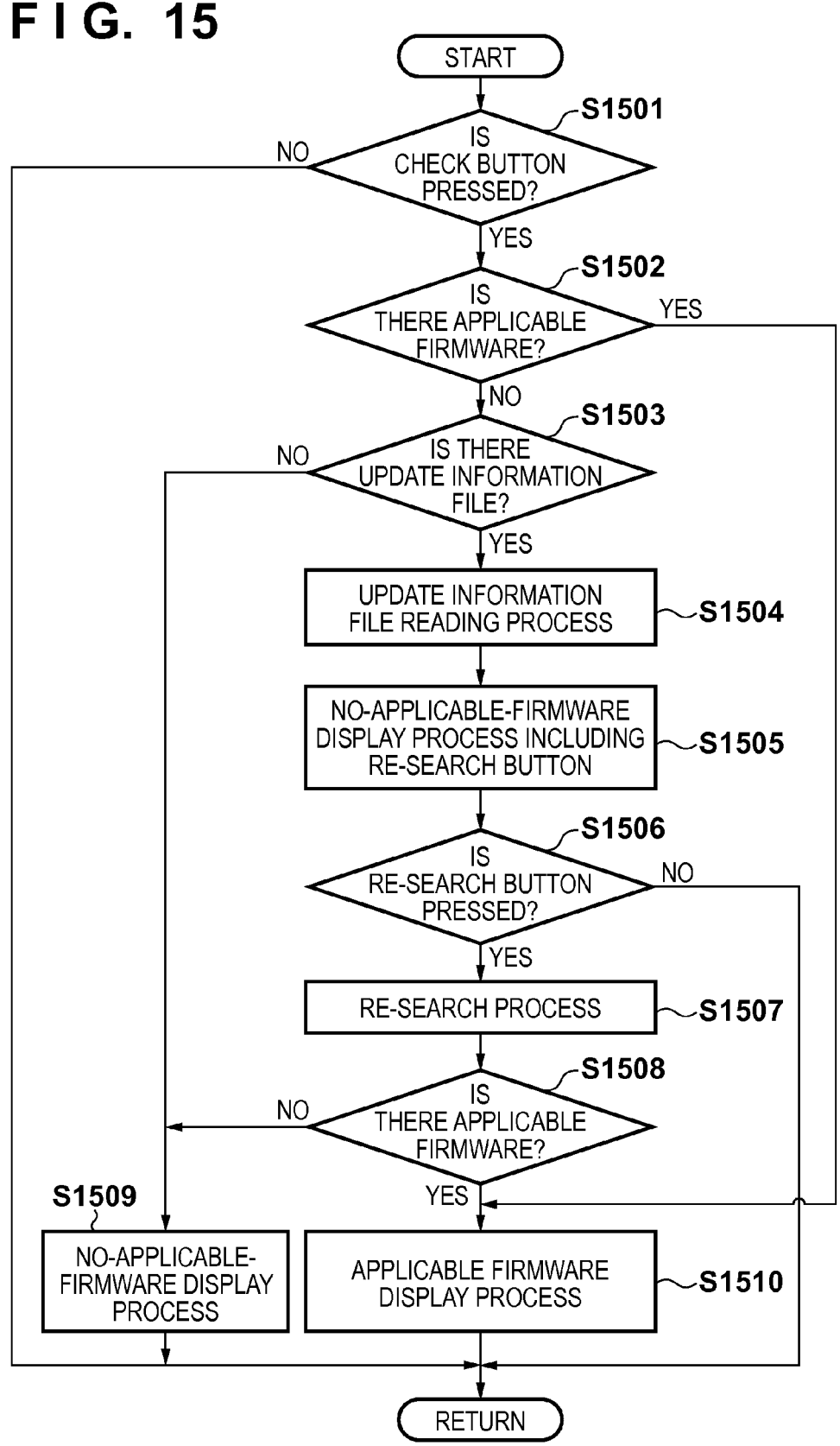
FIG. 15 is a flow chart showing a re-search process of applicable firmware.
Figure 20:
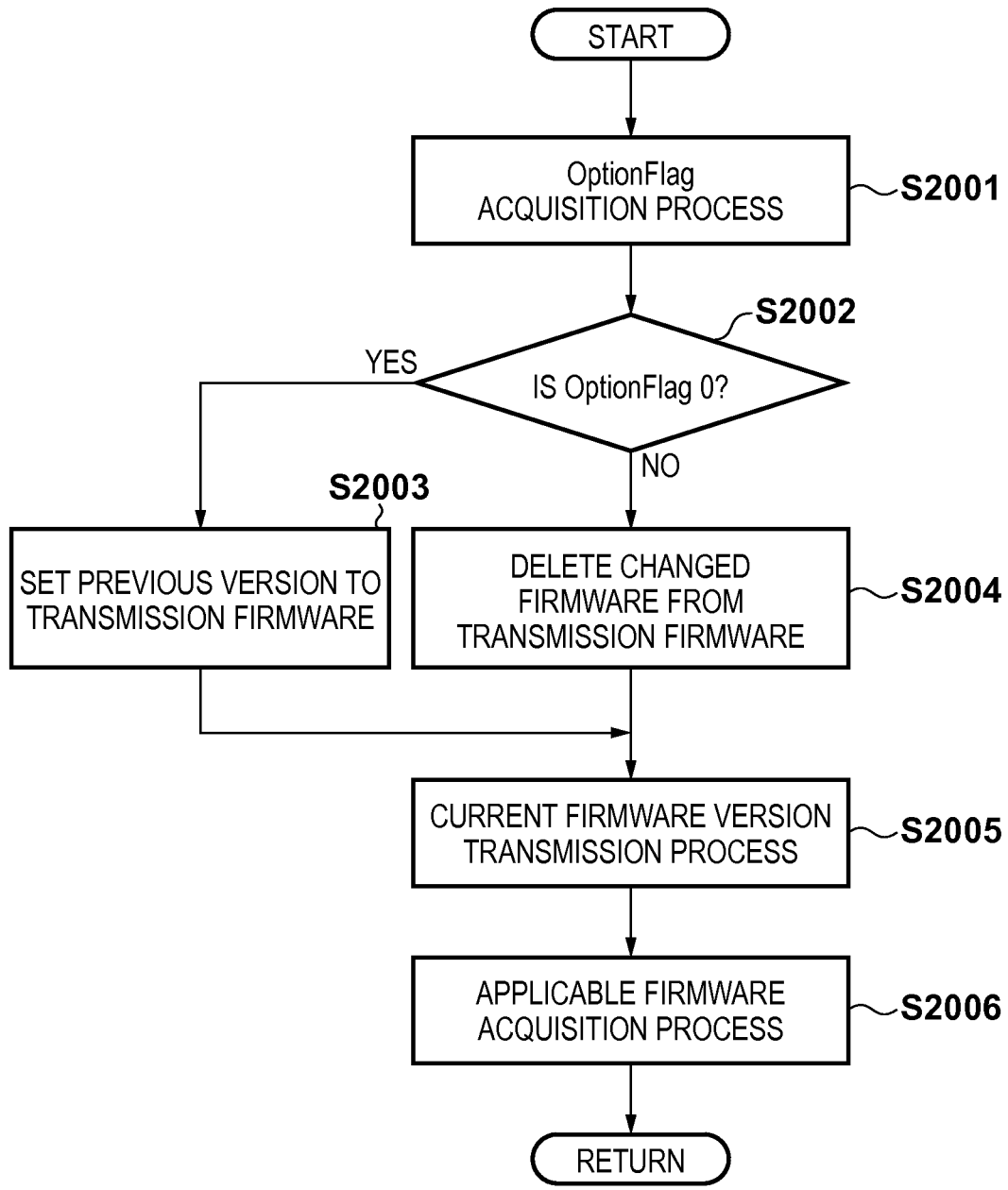
FIG. 20 is a flow chart showing details of the re-search process.

A process for the manager to acquire applicable firmware from the distribution system in the network system shown in FIG. 10 will be described with reference to FIGS. 14 to 20. In the drawings, FIGS. 15, 17, and 20 illustrate processing procedures executed by the image forming apparatus, and the other drawings illustrate user interface screens displayed on the display unit 511 of the image forming apparatus. In the following description, the user denotes the image forming apparatus or the operator of the image forming apparatus.

When the manager operates the operation unit 510 to update the firmware, a user interface screen shown in FIG. 14 is displayed. A procedure of FIG. 15 is started from there. In S1501 shown in FIG. 15, the process waits for the press of a "Check applicable firmware" button 1401. The screen is a screen for checking whether there is applicable firmware in the distribution system. If a "Return to menu" button 1402 is pressed in the screen, the process is finished, and the menu screen is displayed again.

On the other hand, if the "Check applicable firmware" button 1401 is pressed, the process moves to S1502, and the information as shown in FIG. 11, such as the device ID of the image forming apparatus of the sender, the type and the version of the installed firmware, and acquisition information related to the firmware to be acquired, is transmitted to the distribution server 133 as an acquisition request. In response to the information, the distribution server 133 executes a search process (primary search) of firmware, and the distribution server 133 returns the information as shown in FIG. 12.

In S1502, whether there is applicable firmware is determined based on the returned information. The applicable firmware denotes a set of firmware of new versions that can replace the installed firmware set. The determination process is a process of determining whether there is applicable firmware to be presented to the user based on the information transmitted from the distribution server 133 before. If there is applicable firmware, the distribution server 133 transmits a list of information related to the latest applicable firmware, i.e. latest firmware information list, in response to the acquisition request. Therefore, it can be determined in S1502 that there is applicable firmware if the firmware information list is included in the response from the distribution server 133. The distribution server 133 transmits the latest firmware information list for the request by the manager. However, for the request by the service person, the distribution server 133 returns not only the latest firmware information list, but also a firmware information list including all information related to a plurality of applicable pieces of firmware if there are a plurality of pieces of applicable firmware. If the firmware information list returned from the distribution server 133 includes a plurality of firmware sets, the plurality of sets of applicable firmware are listed and displayed set by set in S1510.

In other words, the firmware update request by the manager is a request of collective update in the example, and the firmware update request by the service person is a request of collective update or individual update. The distinction between the collective update and the individual update can be performed according to whether the instruction of update is input by the manager or the service person. Although the distinction between the manager and the service person is possible by the user ID at the user login in the distribution server, the distinction is not necessary in the browser.

Meanwhile, if, for example, the service person has already individually upgraded specific firmware of the image forming apparatus, the version of the firmware set may not coincide with the version of the firmware of the firmware set registered in the distribution server 133. In this case, the distribution server 133 cannot specify the installed firmware group version, and it is determined that there is no applicable firmware. At this point, the distribution server 133 returns an empty firmware information list to the image forming apparatus. If the image forming apparatus refers to the firmware information list returned from the distribution server 133 and determines that there is no applicable firmware in S1502, the image forming apparatus moves to S1503 to determine whether there is an update information file. The update information file is a file as shown in FIGS. 16A and 16B installed with the firmware when the service person individually updates the firmware. A re-search process (i.e., secondary search process) described in detail later can be executed based on the update information file.

An option flag, an identifier of communicated firmware (this will be called a firmware name), and versions before and after the update are recorded in the update information file. The option flag is a flag for designating whether to perform the re-search based on the previous version or to perform the re-search by ignoring the version, after the individual update of the firmware. More specifically, a value "0" is set to the option flag if the manager can perform the collective update of the firmware set based on the previous version after part of the firmware is updated. A value "1" is set if the collective update can be performed by ignoring the version of the individually updated firmware. Meanwhile, a value that is neither "0" nor "1" is set as the value of the option flag if the re-search on the basis of the individual update is not performed.

If there is no update information file as a result of the determination in S1503, the process moves to S1509. A process of displaying the fact that there is no applicable firmware is executed, and the process ends. On the other hand, if there is an update information file, the process moves to S1504 to execute a process of reading the update information file. In S1505, a no-applicable-firmware display process including a re-search button is executed. Details of the display process will be described with reference to FIG. 17.

In S1701, a process of acquiring an option flag (OptionFlag) from the update information file is executed. This process is a process of acquiring a value of an option flag which is one of the parameters of the update information file shown in FIGS. 16A and 16B.

In S1702, the value of the option flag is determined. If the value is "0", the process moves to S1704, and a display process including a re-search button based on the previous version is executed.

Specifically, a message "There is no applicable firmware." and a "Re-search based on previous version" button as shown in FIG. 18 are displayed on the user interface screen. The process returns to S1506 shown in FIG. 15.

If the value of the option flag is not "0", whether the value of the option flag is "1" is determined in S1703. If the value is "1", the process moves to S1706, and a display process including a research button for ignoring the updated firmware is executed. Specifically, a message "There is no applicable firmware." and a "Re-search by ignoring updated firmware" button as shown in FIG. 19 are displayed on the user interface screen. The process returns to S1506 shown in FIG. 15.

On the other hand, if the value of the option flag is not "1" in S1703, the process moves to S1705. The re-search button is not displayed, and only a message "There is no applicable firmware." is displayed on the user interface screen. The process returns to S1506 shown in FIG. 15.

In S1506, whether the re-search button is pressed is determined. This process is a process of determining whether the manager has pressed the research button based on the previous version (FIG. 18) or the re-search button based on updated firmware ignoring (FIG. 19) in the no-applicable-firmware display process including the re-search button. If one of the re-search button based on the previous version and the re-search button based on the updated firmware ignoring is pressed, the process moves to S1507. The process ends if none of the re-search buttons is pressed.

In S1507, a re-search process of applicable firmware is executed. This process is a process of researching a combination (set) of a plurality of pieces of firmware based on the previous version or based on the updated firmware ignoring, in response to the press of the re-search button. Details of the re-search process will be described with reference to FIG. 20.

In S2001, the value of the option flag is acquired as in S1701 of FIG. 17. In S2002, whether the value of the option flag is "0" is determined as in S1702 of FIG. 17. If the value is "0", the process moves to S2003. On the other hand, if the value is not "0", the process moves to S2004.

In S2003, for the individual firmware version to be transmitted, a process of designating the version before the update is executed for the firmware for which the individual update is recorded in the update information file. Specifically, a version 1.1 of firmware A and a version 1.2 of firmware B of FIG. 16A are set to a version 1.0 as a previous version.

In S2004, for the individual firmware, a process of deleting the version of the firmware for which the individual update is recorded in the update information file is executed. That is, the version of the firmware which has been updated individually is not specified. Specifically, the version of the firmware A of FIG. 16B is deleted. The distribution server 133 treats a non-designated version as a version that includes all versions. Not only the version, but also the information specifying the firmware may be deleted in S2004. However, in this case, the distribution server 133 needs to execute the process by treating a firmware set including firmware not included in the information received from the image forming apparatus as a set that can be handled as a candidate of applicable firmware.

In S2005, the previous versions designated in S2003 is handled as the current firmware version to execute a transmission process, or the version partially deleted in S2004 is handled as the current firmware version to execute a transmission process. In S2006, a process of acquiring the applicable firmware from the distribution system (i.e. the distribution server) is executed. As a result, the applicable firmware based on the previous version or based on the partially deleted version can be acquired in a format as shown in FIG. 12.

Returning to FIG. 15, whether applicable firmware is acquired in the re-search process of S1507 is determined in S1508. If applicable firmware cannot be acquired in the transmission based on the previous version or based on the deleted version, it is determined that there is no applicable firmware, and the process moves to S1509. A no-applicable-firmware display process is executed, and the process ends.

On the other hand, if it is determined that there is applicable firmware in the re-search process, the process moves to S1510, and a display process of the applicable firmware is executed. The process is a process of displaying the version of the applicable firmware acquired in S1507 (including the firmware group version), the label name of the version, and the like. The process allows recognizing the applicable firmware, and update to the firmware is possible in a process applied later.

According to the series of operations, the image forming apparatus and the distribution server 133 work together. The image forming apparatus in which it is once determined that there is no applicable firmware in the collective update can re-search a compatible version to search applicable firmware again.

In the present embodiment, applicable firmware corresponding to the version of the installed firmware is first searched, and the re-search is performed in a range of an extended version only when there is no relevant firmware. However, S1501 and S1502 of FIG. 15 can be skipped, and the search process can be started from S1503. In this case, if the option flag indicates 0, a search request including both versions before and after the update of the individually updated firmware needs to be transmitted to the distribution system. In this case, the "research" of FIG. 15 needs to be reread as "search". If there is no update information file in S1503, the process proceeds to S1505. The fact that there is no applicable firmware is not displayed on the window displayed in S1505. If there is no update information, and if the option flag of the update information file is not 0 or 1, only the version of the installed firmware is set as the range to search applicable firmware. As a result, the candidate of the applicable firmware can be displayed by one search.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-272749, filed Dec. 13, 2011, which is hereby incorporated by reference herein in its entirety.

What is claimed is:

1. An image forming apparatus comprising:
a transmission unit that transmits, to a distribution system, a first search request including version information indicating current versions of firmware of the image forming apparatus to search a set of the firmware applicable to the image forming apparatus without using an update information file;
one or more processors; and
at least one memory coupled to the one or more processors, the at least one memory having stored thereon, when an individual-update of firmware of the image forming apparatus is performed, the update information file including version information indicating versions of the firmware before and after the individual-update, wherein the individual-update is a manual update of a part of the firmware of the image forming apparatus, and instructions which, when executed by the one or more processors, cause the image forming apparatus to:
  set, to the update information file, flag information indicating a search option of a set of the firmware applicable to the image forming apparatus;
  acquire, from the distribution system, a set of applicable firmware found by using the version information included in the first search request in the distribution system and that performs an update using the acquired set of the applicable firmware; and
  determine whether or not the update information file is stored if a set of applicable firmware corresponding to the version information included in the first search request is not obtained from the distribution system,
wherein the transmission unit transmits, to the distribution system, a second search request including version information included in the update information file if it is determined that the update information file is stored and the flag information indicates, as the search option, to use the version of the firmware before the individual-update for the search.

2. The image forming apparatus according to claim 1, wherein the transmission unit transmits, to the distribution system, a third search request not including the information of the version of the individually updated firmware if it is determined that the update information file is stored and the flag information indicates, as the search option, to ignore the version of the individually updated firmware for the search.

3. The image forming apparatus according to claim 1, wherein the transmission unit transmits, to the distribution system, the second search request including the version information included in the update information file for a re-search process after the transmission of the first search request including the version information indicating the current version of the firmware installed in the image forming apparatus.

4. The image forming apparatus according to claim 1, wherein if a plurality of sets of the applicable firmware are found, a list of the plurality of sets is displayed and an update of the firmware installed in the image forming apparatus is performed based on a set of firmware selected from the list.

5. The image forming apparatus according to claim 1, wherein the instructions, when executed by the one or more processors, further cause the image forming apparatus to:
receive input of a user identifier of an operator; and
determine whether an update request of firmware is a request of a collective update or not according to the user identifier.

6. A network system comprising:
an image forming apparatus comprising:
a transmission unit that transmits, to a distribution system, a first search request including version information indicating current versions of firmware of the image forming apparatus to search a set of the firmware applicable to the image forming apparatus without using an update information file;
one or more processors; and
at least one memory coupled to the one or more processors having stored thereon, when an individual-update of firmware of the image forming apparatus is performed, the update information file including version information indicating versions of the firmware before and after the individual-update, wherein the individual-update is a manual update of a part of the firmware of the image forming apparatus, and instructions which, when executed, cause the image forming apparatus to:
set, to the update information file, flag information indicating a search option of a set of firmware applicable to the image forming apparatus;
acquire, from the distribution system, a set of applicable firmware found by using the version information included in the first search request in the distribution system and perform an update using the acquired set of the applicable firmware; and
determine whether or not the update information file is stored if a set of applicable firmware corresponding to the version information included in the first search request is not obtained from the distribution system,
wherein the transmission unit transmits, to the distribution system, a second search request including version information included in the update information file if it is determined that the update information file is stored and the flag information indicates, as the search option, to use the version of the firmware before the individual-update for the search; and the distribution system that searches a set of firmware applicable to the image forming apparatus based on information received from the image forming apparatus to distribute the set of firmware.

7. A non-transitory computer readable medium storing a program thereon for causing a computer to perform a method of managing an image forming apparatus, the method comprising:
storing, when an individual-update of firmware of the image forming apparatus is performed, an update information file including version information indicating versions of the firmware before and after the individual-update, wherein the individual-update is a manual update of a part of the firmware of the image forming apparatus;
setting, to the update information file, flag information indicating a search option of a set of firmware applicable to the image forming apparatus;
transmitting, to a distribution system, a first search request including version information indicating current versions of firmware of the image forming apparatus to search the set of the firmware applicable to the image forming apparatus without using the update information file;
acquiring, from the distribution system, a set of applicable firmware found by using the version information included in the first search request in the distribution system;
performing an update using the acquired set of the applicable firmware; and
determining whether or not the update information file is stored if a set of applicable firmware corresponding to the version information included in the first search request is not obtained from the distribution system,
wherein a second search request including version information included in the update information file is transmitted to the distribution system in the transmitting, if it is determined that the update information file is stored and the flag information indicates, as the search option, to use the version of the firmware before the individual-update for the search.

8. A method of managing an image forming apparatus, comprising:
storing, when an individual-update of firmware of the image forming apparatus is performed, an update information file including version information indicating versions of the firmware before and after the individual-update, wherein the individual-update is a manual update of a part of the firmware of the image forming apparatus;
setting, to the update information file, flag information indicating a search option of a set of firmware applicable to the image forming apparatus;
transmitting, to a distribution system, a first search request including version information indicating current versions of firmware of the image forming apparatus to search the set of the firmware applicable to the image forming apparatus without using the update information file;
acquiring, from the distribution system, a set of applicable firmware found by using the version information included in the first search request in the distribution system;
performing an update using the acquired set of the applicable firmware; and
determining whether or not the update information file is stored if a set of applicable firmware corresponding to the version information included in the first search request is not obtained from the distribution system, wherein a second search request including version information included in the update information file is transmitted to the distribution system in the transmitting, if it is determined that the update information file is stored and the flag information indicates, as the search option, to use the version of the firmware before the individual-update for the search.

* * * * *